United States Patent
Wang et al.

(10) Patent No.: US 11,876,843 B2
(45) Date of Patent: Jan. 16, 2024

(54) METHOD, APPARATUS, MEDIUM AND ELECTRONIC DEVICE FOR GENERATING ROUND-TABLE VIDEO CONFERENCE

(71) Applicant: OOOK (Beijing) Education and Technology Co., Ltd, Beijing (CN)

(72) Inventors: Kesheng Wang, Beijing (CN); Jin Huang, Beijing (CN); Gang Huang, Beijing (CN); Qiaoling Xu, Beijing (CN); Minglu Cao, Beijing (CN)

(73) Assignee: OOOK (BEIJING) EDUCATION AND TECHNOLOGY CO., LTD, Beijing (CN)

( * ) Notice: Subject to any disclaimer, the term of this patent is extended or adjusted under 35 U.S.C. 154(b) by 297 days.

(21) Appl. No.: 17/522,958

(22) Filed: Nov. 10, 2021

(65) Prior Publication Data

US 2023/0061662 A1  Mar. 2, 2023

(30) Foreign Application Priority Data

Aug. 31, 2021 (CN) .......................... 202111015245.8

(51) Int. Cl.
*H04L 65/403* (2022.01)
*G06T 7/10* (2017.01)
(Continued)

(52) U.S. Cl.
CPC .............. *H04L 65/403* (2013.01); *G06T 7/10* (2017.01); *G06T 7/70* (2017.01); *G06T 11/00* (2013.01);
(Continued)

(58) Field of Classification Search
CPC .............. H04L 65/403; H04L 65/4015; H04L 12/1818; H04L 63/101; H04L 63/108; H04L 12/1822; H04L 63/102; H04L 65/1089; H04L 65/1093; H04L 65/80; G06T 7/10; G06T 7/70; G06T 11/00; G06T 17/20; G06T 2207/10016; G06T 2207/20084; G06T 2207/30201;
(Continued)

(56) References Cited

U.S. PATENT DOCUMENTS

7,336,296 B2 * 2/2008 Brown ...................... G06T 7/70
348/135
9,460,337 B2 * 10/2016 Ohba ................... G06V 40/167
(Continued)

*Primary Examiner* — Phung-Hoang J Nguyen
(74) *Attorney, Agent, or Firm* — XSENSUS LLP (57) ABSTRACT

The present disclosure provides a method, an apparatus, a medium and an electronic device for generating a round-table video conference. In the present disclosure, in response to the head instruction information of the participant, the scrolling starting number is determined from the round-table seat number sequence through the video of the current presenter, and the scrolling ending number is determined from the round-table seat number sequence through the video of the current speaker, thereby the scrolling sequence of the target seat numbers is obtained. According to the scrolling sequence, a manner of the virtual camera in the center of the round table being rotated and shooting is simulated, and the images of the participants queued between two points are scrolled and displayed, so that a virtual round-table conference scene is created in the video conference.

9 Claims, 6 Drawing Sheets

(51) Int. Cl.
*G06T 7/70* (2017.01)
*G06V 40/16* (2022.01)
*G06V 20/40* (2022.01)
*G06T 11/00* (2006.01)
*G06T 17/20* (2006.01)

(52) U.S. Cl.
CPC .............. *G06T 17/20* (2013.01); *G06V 20/41* (2022.01); *G06V 40/161* (2022.01); *G06T 2207/10016* (2013.01); *G06T 2207/20084* (2013.01); *G06T 2207/30201* (2013.01)

(58) Field of Classification Search
CPC . G06T 7/11; G06T 15/04; G06T 15/20; G06T 15/205; G06T 19/00; G06T 19/20; G06T 2200/08; G06T 2219/2004; G06V 20/41; G06V 40/161; G06V 40/16; G06V 40/20; Y02D 10/00; H04N 7/157; H04N 21/42653; H04N 7/15; H04N 21/44; H04N 7/144; H04N 7/147; H04N 7/152; G06N 3/02; G06N 3/08; G06N 3/04; G06N 3/045; G06F 3/013
See application file for complete search history.

(56) References Cited

U.S. PATENT DOCUMENTS

2011/0216153 A1* 9/2011 Tasker ..................... H04N 7/15
348/E7.083
2021/0406987 A1* 12/2021 Kornilov .............. G06V 40/172

* cited by examiner

METHOD, APPARATUS, MEDIUM AND ELECTRONIC DEVICE FOR GENERATING ROUND-TABLE VIDEO CONFERENCE

CROSS-REFERENCE TO RELATED APPLICATION

This application claims priority from Chinese Application No. 202111015245.8, filed on Aug. 31, 2021, the contents of which are incorporated by reference herein in its entirety.

TECHNICAL FIELD

The present disclosure relates to the field of image processing, in particular to a method, an apparatus, a medium and an electronic device for generating a round-table video conference.

BACKGROUND

With the development of Internet technology, a video conference based on Internet technology can realize simultaneous remote communication of more than one person, which can realize both call communication and video communication, thereby perfectly solving the problem of remote conferences in multiple places.

However, in a display part of current video conferences, the videos of multiple participants are often placed on a desktop of a terminal at will, and the background of the participants is messy, which undermines the seriousness of the conference.

SUMMARY

Some embodiments of the disclosure provide a method for generating a round-table video conference, comprising:
acquiring head indication information of a current participant from a currently captured video;
acquiring, in response to the head indication information, a first seat number corresponding to a video of the current presenter and a second seat number corresponding to a video of a current speaker from a round-table seat number, wherein the first seat number is used to represent a scrolling starting number, and the second seat number is used to represent a scrolling ending number;
determining all target seat numbers and a scrolling sequence of the target seat numbers based on the scrolling starting number, the scrolling ending number and the head indication information; and
generating and displaying a virtual round-table video in the form of a simulated round-table conference according to the scrolling sequence and target videos corresponding to the target seat numbers, wherein the virtual round-table video comprises images of the participants in the target videos being scrolled and displayed to an image of the current speaker successively according to the scrolling sequence.

In some embodiments, the generating and displaying a virtual round-table video in the form of a simulated round-table conference according to the scrolling sequence and target videos corresponding to the target seat numbers comprises:
acquiring a matting video according to the target videos corresponding to the target seat numbers, wherein the matting video only comprises the images of the participants in the target videos;
obtaining a virtual participant video corresponding to the target seat number based on fusion of a foreground image representing equipment of a virtual conference room, and a background image representing environment of the virtual conference room, as well as the images of the participants in the matting video; and
generating and displaying the virtual round-table video according to the scrolling sequence and the virtual participant video corresponding to the target seat number.

In some embodiments, wherein the generating and displaying the virtual round-table video according to the scrolling sequence and the virtual participant video corresponding to the target seat number comprises:
acquiring a first virtual participant image and a second virtual participant image corresponding to each time point in a continuous time point sequence, wherein the first virtual participant image belongs to a first virtual participant video, and the second virtual participant image belongs to a second virtual participant video, and the target seat number corresponding to the first virtual participant video is arranged adjacently in front of the target seat number corresponding to the second virtual participant video in the scrolling sequence;
calculating a percentage of a sequence number of the each time point in the continuous time point sequence to total sequence number of the continuous time point sequence to obtain a first cutting ratio;
obtaining a remaining second cutting ratio based on the first cutting ratio;
performing a length segmentation on the second virtual participant image corresponding to the each time point, so that a second segmented image segmented based on the first cutting ratio is obtained from a side of a reverse scrolling direction, and performing a length segmentation on the first virtual participant image corresponding to the each time point, so that a first segmented image segmented based on the second cutting ratio is obtained from a side of the scrolling direction;
generating a virtual composite image matching the seat number sequence based on the target seat number corresponding to the first segmented image and the target seat number corresponding to the second segmented image; and
generating and displaying a video clip of the virtual round-table based on the virtual composite image corresponding to continuous time points.

In some embodiments, the determining all target seat numbers and a scrolling sequence of the target seat numbers based on the scrolling starting number, the scrolling ending number and the head indication information comprises:
determining all target seat numbers and a scrolling sequence of the target seat numbers from the seat number sequence from the scrolling starting number to the scrolling ending number orderly, in response to the scrolling starting number being smaller than the scrolling ending number, and the head indication information including information about the head swinging to the right;
determining all target seat numbers and a scrolling sequence of the target seat numbers from the seat number sequence from the scrolling starting number to the a starting number of the seat number sequence in reverse order, and from an ending number of the seat number sequence to the scrolling ending number in reverse order, in response to the scrolling starting number being smaller than the scrolling ending number, and the head indication information including information about the head swinging to the left;

determining all target seat numbers and a scrolling sequence of the target seat numbers from the seat number sequence from the scrolling starting number to the scrolling ending number in reverse order in response to the scrolling starting number being greater than the scrolling ending number, and the head indication information including the information about the head swinging to the left; and determining all target seat numbers and a scrolling sequence of the target seat numbers from the seat number sequence from the scrolling starting number to an ending number of the seat number sequence orderly, and from a starting number of the seat number sequence to the scrolling ending number orderly, in response to the scrolling starting number being greater than the scrolling ending number, and the head indication information including the information about the head swinging to the right.

In some embodiments, the acquiring head indication information of a current participant from a currently captured video comprises:

acquiring a video image of the current participant from the currently captured video;

determining two-dimensional positional information and marking information of facial structure points in the video image, wherein the facial structure points are marked in a facial area of the current participant in the video image;

determining head rotation information of the current participant in a specified direction based on the two-dimensional positional information and the marking information of all facial structure points; and generating, in response to the head rotation information satisfies an indication condition, the head indication information of the current participant based on the head rotation information.

In some embodiments, the determining head rotation information of the current participant in a specified direction based on the two-dimensional positional information and the marking information of all facial structure points comprises:

in the facial area of the video image, using each two-dimensional positional information as vertex position information to obtain facial mesh information, according to a connection relationship rule of the marking information; and inputting reference mesh information and the facial mesh information corresponding to the current participant into a trained neural network model to obtain the head rotation information, wherein the reference mesh information is obtained based on the two-dimensional positional information and the marking information of the facial structure points in a reference image of the current participant, and the facial structure points in the video image and the facial structure points in the reference image have a corresponding relationship with respect to the facial position of the current participant.

In some embodiments, the method further comprises:

acquiring specific facial images of the current participant taken at multiple specific angles in advance;

determining the two-dimensional positional information and the marking information of the facial structure points in each specific facial image, wherein the facial structure points are marked in the facial area of the current participant in the specific facial image;

in the facial area of the specific facial image, using each two-dimensional positional information as vertex position information to obtain specific mesh information according to a connection relationship rule of the marking information; and acquiring a reference image and reference mesh information matched with the facial structure from a reference facial model library, based on the specific mesh information of the current participant.

Some embodiments of the disclosure provide an apparatus for generating a round-table video conference, comprising:

an acquisition unit configured to acquire head indication information of a current participant from a currently captured video;

a response unit configured to acquire, in response to the head indication information, a first seat number corresponding to a video of the current presenter and a second seat number corresponding to a video of a current speaker from a round-table seat number, wherein the first seat number is used to represent a scrolling starting number, and the second seat number is used to represent a scrolling ending number;

a determination unit configured to determine all target seat numbers and a scrolling sequence of the target seat numbers based on the scrolling starting number, the scrolling ending number and the head indication information; and a generation unit configured to generate and displaying a virtual round-table video in the form of a simulated round-table conference according to the scrolling sequence and target videos corresponding to the target seat numbers, wherein the virtual round-table video comprises images of the participants in the target videos being scrolled and displayed to an image of the current speaker successively according to the scrolling sequence.

Some embodiments of the disclosure provide a computer-readable storage medium with a computer program stored thereon, when the program is executed by a processor, the method according to any of the above embodiments is implemented.

Some embodiments of the disclosure provide an electronic device, comprising:

one or more processors;

a storage configured to store one or more programs, wherein, when the one or more programs are executed by the one or more processors, the one or more processors implement the method according to any of the above embodiments.

Compared with the related art, the above solutions of the embodiments of the present disclosure have at least the following beneficial effects:

The present disclosure provides a method, an apparatus, a medium and an electronic device for generating a round-table video conference. In the present disclosure, in response to the head instruction information of the participant, the scrolling starting number is determined from the round-table seat number sequence through the video of the current presenter, and the scrolling ending number is determined from the round-table seat number sequence through the video of the current speaker, thereby the scrolling sequence of the target seat numbers is obtained. According to the scrolling sequence, a manner of the virtual camera in the center of the round table being rotated and shooting is simulated, and the images of the participants queued between two points are scrolled and displayed, so that a virtual round-table conference scene is created in the video conference.

DETAILED DESCRIPTION OF EMBODIMENTS

In order to make the objectives, technical solutions, advantages of the present disclosure clearer, the present disclosure will be further described in detail below with reference to the accompanying drawings. Obviously, the described embodiments are only a part of the embodiments of the present disclosure, rather than all the embodiments. Based on the embodiments in the present disclosure, all other embodiments obtained by a those skilled in the art without creative work shall fall within the protection scope of the present disclosure.

The terms used in the embodiments of the present disclosure are only for the purpose of describing specific embodiments, and are not intended to limit the present disclosure. The singular forms of "a", "said" and "the" used in the embodiments of the present disclosure and the appended claims are also intended to include plural forms, unless the context clearly indicates other meanings, "multiple" generally contains at least two types.

It should be understood that the term "and/or" used in this description is only an association relationship describing associated objects, indicating that there can be three types of relationships. For example, A and/or B can mean that there are three cases where A alone, A and B, and B alone. In addition, the character "/" in this text generally indicates that the associated objects before and after are in an "or" relationship.

It should be understood that although the terms first, second, third, etc. may be used to describe the embodiments of the present disclosure, these descriptions should not be limited to these terms. These terms are only used to distinguish the description. For example, without departing from the scope of the embodiments of the present disclosure, the first may also be referred to as the second, and similarly, the second may also be referred to as the first.

Depending on the context, the words "if" and "whether" as used herein can be interpreted as "when" or "as" or "in response to determination" or "in response to detection". Similarly, depending on the context, the phrase "if . . . determined" or "if (statement or event) . . . detected" can be interpreted as "when determined" or "in response to determination" or "when detected (statement or event)" or "in response to detection (statement or event)".

It should also be noted that the terms "include", "comprise" or any other variants thereof are intended to cover non-exclusive inclusion, so that a commodity or device including a series of elements not only includes those elements, but also includes those elements that are not explicitly listed. Other elements of, or also include elements inherent to this commodity or device. If there are no more restrictions, the element defined by the sentence "includes a . . ." does not exclude the existence of another same element in the commodity or device that includes the element.

Optional embodiments of the present disclosure will be described in detail below with reference to the accompanying drawings.

In the embodiments of the present disclosure, all participants are gathered at a virtual round-table, and a terminal used by each participant can scroll from an image of a current presenter of the terminal to an image of a current speaker according to head instruction information of the participants. In the process of scrolling, a way of rotating and shooting by a virtual camera in the center of the round-table is simulated, and images of the participants queued between the presenter and the speaker are scrolled and displayed, so as to create a virtual round-table conference scene in a video conference.

Figure 1:
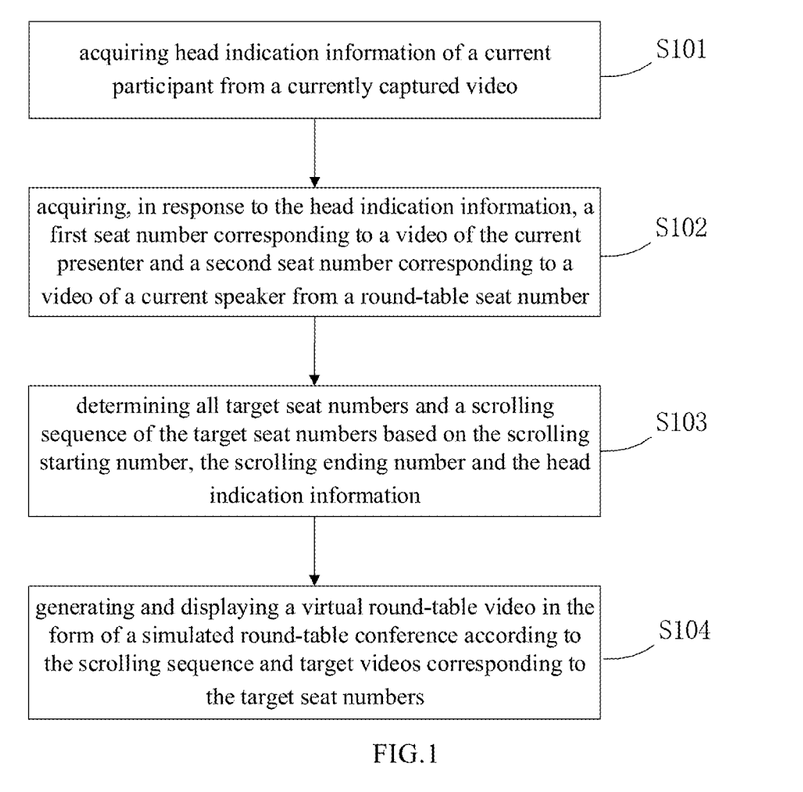
FIG. 1 shows a flowchart of a method for generating a round-table video conference according to embodiments of the present disclosure.

In this regard, as shown in FIG. 1, the embodiment provided by the present disclosure is an embodiment of a method for generating a round-table video conference.

The embodiment of the present disclosure will be described in detail below with reference to FIG. 1.

In step S101, head indication information of a current participant is acquired from a currently captured video.

The currently captured video is captured by a camera of a current terminal used by the current participant. For example, if the current participant participates in a video conference through a mobile phone, a built-in camera of the mobile phone is used for capturing the video; if the current participant participates in the video conference through a computer, a built-in/external camera of the computer is used for capturing the video.

The currently captured video is not necessarily used for displaying in the current terminal, but is mainly used to analyze whether the current participant has sent head instruction information. The head indication information is used to instruct the current terminal to simulate a round-table conference scene to scroll to an image of the current speaker and display. If the current participant in front of the current terminal is the current speaker, an image of the current participant can be displayed on the current terminal.

Optionally, the head indication information includes information about the head swinging to the left or information about the head swinging to the right. In the embodiment of the present disclosure, a rotation direction of a virtual camera is indicated by a swing direction of the head.

In step S102, a first seat number corresponding to a video of a current presenter and a second seat number corresponding to a video of the current speaker are acquired from a round-table seat number sequence, in response to the head instruction information.

The embodiment of the present disclosure provides the seat number of the round table for the video captured by each participant, and the seat number is a virtual seat number. If the virtual camera rotates to the seat number, the current terminal used by the current participant will display the video corresponding to the seat number.

In order to be able to manage the seat number, the embodiment of the present disclosure provides a round-table seat number sequence. The seat number sequence records the correspondence between the seat numbers and the video of the participants, and the relationship between the seat numbers. Such relationship can be understood as the positional relationship of the videos corresponding to the seat numbers in front of the round table, and can also be understood as the positional relationship of the participants corresponding to the seat numbers in front of the round table.

The round-table seat number sequence can be automatically established according to the order in which the participants enter a video conference room, or can be preset according to identities of the participants. The present disclosure does not make special limitations.

The video of the current presenter can be understood as the video of the participant displayed on the current terminal of the current participant.

The video of the current speaker can be understood as the audio of the current speaker transmitted from the current terminal of the current participant. The audio of the current speaker does not necessarily come from the original video of the current presenter, but may come from an original video of another participant not being displayed, then the original video of the participant not being displayed is the video of the current speaker.

The first seat number is used to represent a scrolling starting number, and the second seat number is used to represent a scrolling ending number.

In step S103, all target seat numbers and a scrolling sequence of the target seat numbers are determined from the seat number sequence based on the scrolling starting number, the scrolling ending number and the head indication information.

The target seat numbers can be understood as all seat numbers that the virtual camera passes through when the virtual camera rotates from the scrolling starting number to the scrolling ending number.

In order to facilitate effective management of target seat numbers, embodiments of the present disclosure provide a scrolling sequence of the target seat numbers. The scrolling sequence records correspondence between the target seat numbers and the videos of the participants, and an order of the target seat numbers passed by the virtual camera when it rotates. The order of the target seat numbers is established based on the relationship of the seat numbers in the seat number sequence.

In a specific embodiment, said that all target seat numbers and a scrolling sequence of the target seat numbers are determined from the seat number sequence based on the scrolling starting number, the scrolling ending number and the head indication information includes the following steps:

In step S103a, in response to the scrolling starting number being smaller than the scrolling ending number, and the head indication information including information about the head swinging to the right, all target seat numbers and a scrolling sequence of the target seat numbers are determined from the seat number sequence from the scrolling starting number to the scrolling ending number orderly.

Figure 2:
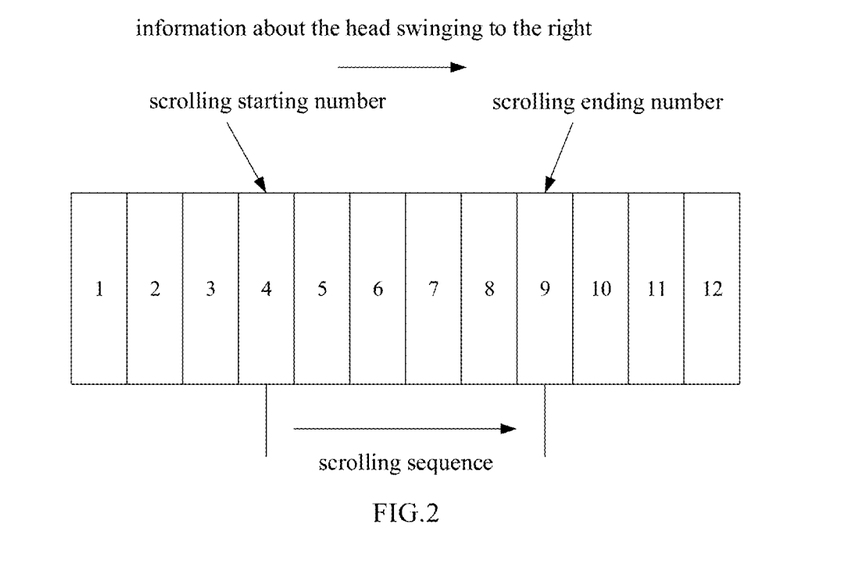
FIG. 2 shows a schematic diagram of a scrolling sequence for determining a target seat number according to embodiments of the present disclosure.

For example, as shown in FIG. 2, the seat number sequence includes seat numbers 1-12, the scrolling starting number determined is seat number 4, and the scrolling ending number is seat number 9. If the head indication information includes the information about the head swinging to the right, then the scrolling sequence includes target seat numbers 4-9.

In step S103b, in response to the scrolling starting number being smaller than the scrolling ending number, and the head indication information including information about the head swinging to the left, all target seat numbers and a scrolling sequence of the target seat numbers are determined from the seat number sequence from the scrolling starting number to the a starting number of the seat number sequence in reverse order, and from an ending number of the seat number sequence to the scrolling ending number in reverse order.

Figure 3:
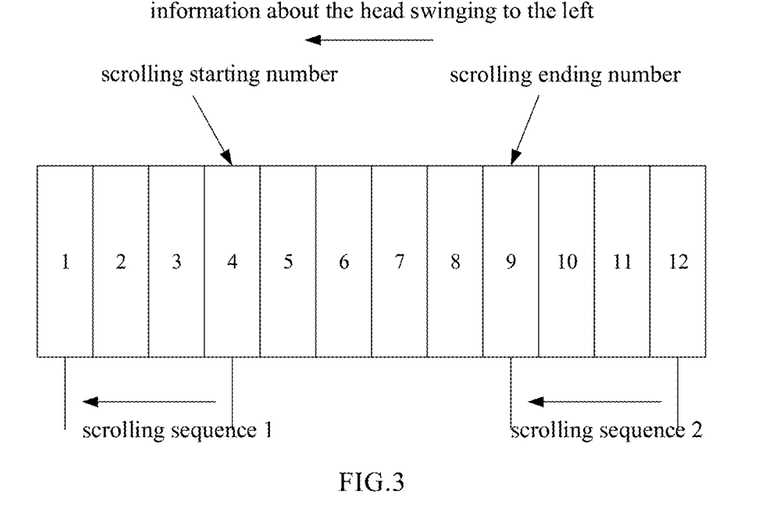
FIG. 3 shows a schematic diagram of a scrolling sequence for determining a target seat number according to embodiments of the present disclosure.

For example, as shown in FIG. 3, continued above example, the scrolling starting number determined is seat number 4, and the scrolling ending number is seat number 9. If the head indication information includes the information about the head swinging to the left, then the scrolling sequence includes target seat numbers 4-1 and target seat numbers 12-9.

In step S103c, in response to the scrolling starting number being greater than the scrolling ending number, and the head indication information including the information about the head swinging to the left, all target seat numbers and a scrolling sequence of the target seat numbers are determined from the seat number sequence from the scrolling starting number to the scrolling ending number in reverse order.

Figure 4:
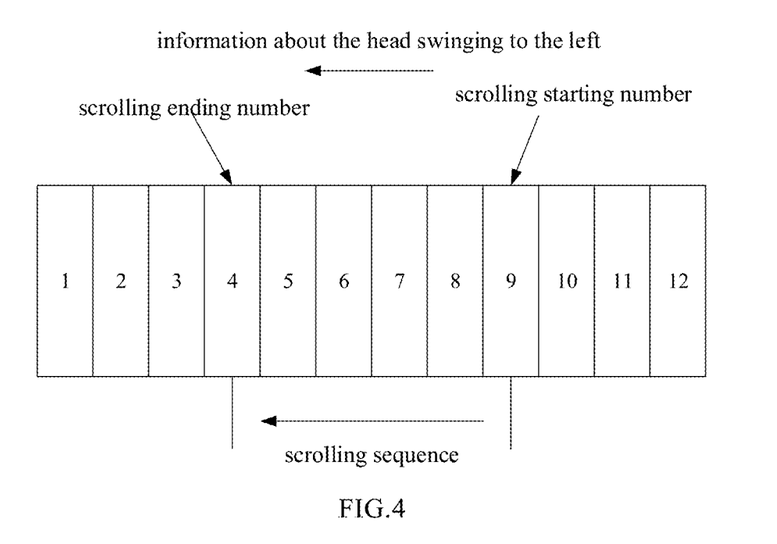
FIG. 4 shows a schematic diagram of a scrolling sequence for determining a target seat number according to embodiments of the present disclosure.

For example, as shown in FIG. 4, continued above example, the scrolling starting number determined is seat number 9, and the scrolling ending number is seat number 4. If the head indication information includes the information about the head swinging to the left, then the scrolling sequence includes target seat numbers 9-4.

In step S103d, in response to the scrolling starting number being greater than the scrolling ending number, and the head indication information including the information about the head swinging to the right, all target seat numbers and a scrolling sequence of the target seat numbers are determined from the seat number sequence from the scrolling starting number to an ending number of the seat number sequence orderly, and from a starting number of the seat number sequence to the scrolling ending number orderly.

Figure 5:
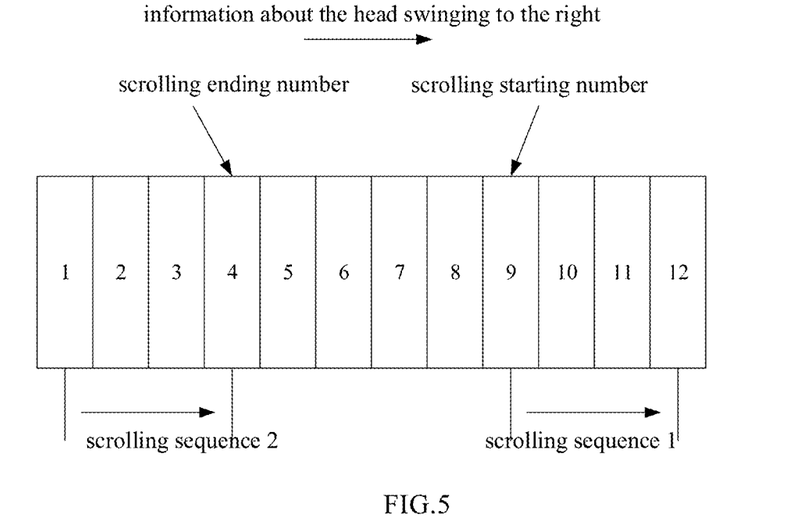
FIG. 5 shows a schematic diagram of a scrolling sequence for determining a target seat number according to embodiments of the present disclosure.

For example, as shown in FIG. 5, continued above example, the scrolling starting number determined is seat number 9, and the scrolling ending number is seat number 4. If the head instruction information includes the information about the head swinging to the right, then the scrolling sequence includes target seat numbers 9-12 and target seat numbers 1-4.

In step S104, a virtual round-table video in the form of a simulated round-table conference is generated and displayed according to the scrolling sequence and target videos corresponding to the target seat numbers.

Herein, the virtual round-table video includes the images of the participants in the target video being scrolled and displayed to the image of the current speaker successively according to the scrolling sequence. For example, it is scrolled and displayed horizontally to the image of the current speaker successively according to the scrolling sequence.

In the embodiment of the present disclosure, in response to the head instruction information of the participant, the scrolling starting number is determined from the round-table seat number sequence through the video of the current presenter, and the scrolling ending number is determined from the round-table seat number sequence through the video of the current speaker, thereby the scrolling sequence of the target seat numbers is obtained. According to the scrolling sequence, a manner of the virtual camera in the center of the round table being rotated and shooting is simulated, and the images of the participants queued between two points are scrolled and displayed, so that a virtual round-table conference scene is created in the video conference.

Figure 6:
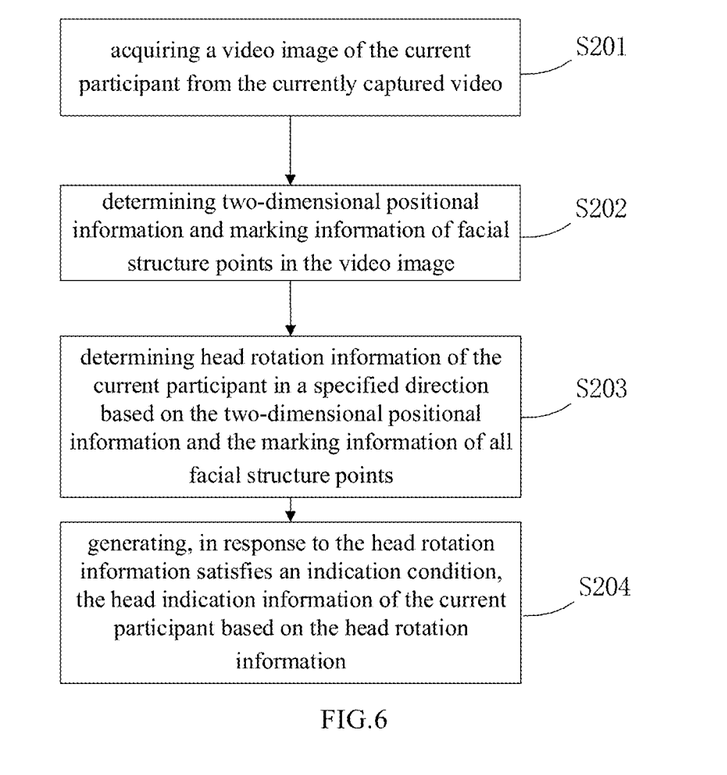
FIG. 6 shows a flowchart of a method for obtaining head indication information of a current participant according to embodiments of the present disclosure.

Since the embodiment of the present disclosure is further optimized based on above-mentioned embodiments, explanations based on the same method and meanings of the same name are the same as the above-mentioned embodiment, and will not be repeated here, as shown in FIG. 6.

Said that head indication information of a current participant is acquired from a currently captured video includes the following steps:

In step S201, a video image of the current participant is acquired from the currently captured video.

The video is composed of frames of video images taken continuously. Therefore, when the video is analyzed, that is, changes in the video image are analyzed.

In step S202: two-dimensional positional information and marking information of facial structure points in the video image is determined.

Figure 7:
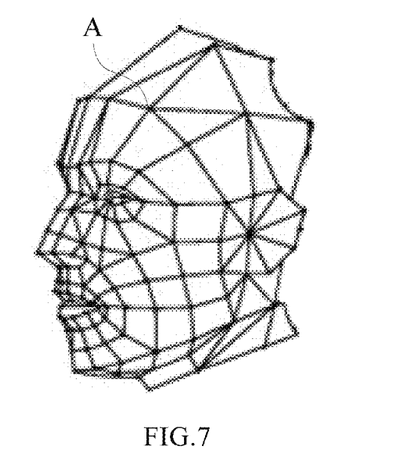
FIG. 7 shows a schematic diagram of facial structure points in a video image according to embodiments of the present disclosure.

The facial structure points are marked in a facial area of the current participant in the video image. All facial structure points can reflect a facial posture of the current participant. As shown in FIG. 7, a node of the mesh is the facial structure point A. Furthermore, the facial structure points include two-dimensional positional information and marking information, and the marking information is used to indicate a positional feature of the current participant's face that the two-dimensional position information corresponds to, and the positional feature is an inherent feature of the current participant's face. For example, the facial structure point at the left inner corner of the eye is marked as "J51"; the facial structure point at the right inner corner of the eye is marked as "J52". Optionally, the facial structure points include feature points of the five sense organs and feature points of the face shape.

In step S203, head rotation information of the current participant in a specified direction is determined based on the two-dimensional positional information and the marking information of all facial structure points.

For example, in space coordinates, the specified direction is a positive direction of an X axis, a positive direction of a Y axis, and a positive direction of a Z axis.

In the embodiment of the present disclosure, the head rotation information of the current participant is determined through facial structure points, and if the head rotation information satisfies an indication condition, the head indication information of the current participant is generated based on the head rotation information. For example, the information about the head swinging to the right or the information about the head swinging to the left. If the facial structure points are limited to the feature points of the five sense organs and/or the feature points of the face shape, the amount of data processing can be reduced, and the efficiency of the data processing can be improved.

In a specific embodiment, said that head rotation information of the current participant in a specified direction is determined based on the two-dimensional positional information and the marking information of all facial structure points includes the following steps:

In step S203-1, in the facial area of the video image, according to a connection relationship rule of the marking information, each two-dimensional positional information is used as vertex position information to obtain facial mesh information.

The connection relationship rule provides the connection relationship between the marking information. For example, the connection relationship rule provides: the marking information "J52" is connected with the marking information "J60", "J61" and "J62". Therefore, in the facial area of the video image, the two-dimensional positional information corresponding to the marking information "J52", "J60", "J61" and "J62" can be connected as the vertex positional information of the mesh, thereby generating the facial mesh information.

The facial mesh information includes the two-dimensional positional information and the marking information of each mesh vertex and the two-dimensional positional information and the marking information of adjacent mesh vertices connected to the mesh vertex.

In step S203-2, reference mesh information and the facial mesh information corresponding to the current participant are input into a trained neural network model to obtain the head rotation information.

Herein, the reference mesh information is obtained based on the two-dimensional positional information and the marking information of the facial structure points in a reference image of the current participant.

Before the video conference is held, the current terminal uses the reference images and reference mesh information obtained by specific facial images taken by the current participant at multiple specific angles, which are mainly used as control data to analyze movements of the head of the current participant.

The facial structure points in the video image and the facial structure points in the reference image have a corresponding relationship with respect to the facial position of the current participant. For example, the facial structure points of a first image of the current participant and the facial structure points of a second image are both located at the left inner corner of the face of the current participant. Therefore, the facial structure points of the two images have a corresponding relationship in terms of the facial position of the participant.

This specific embodiment uses the corresponding relationship to determine the positional relationship between the facial structure points of the reference mesh information and the facial structure points of the facial mesh information, and then the head rotation information of the current participant in the specified direction is obtained through the trained neural network model. Therefore tedious three-dimensional calculations are reduced, and the processing efficiency of analyzing head movements and the fluency of the video conference are improved.

The reference mesh information is taken as the reference information for determining the facial mesh information of the facial image when determining the head rotation direction. For example, the reference mesh information is generated based on the reference facial image.

When training the neural network model, the head rotation direction and the facial mesh information and reference mesh information with respect to this direction are used as training samples and input into the neural network model until a preset accuracy is reached. For example, if the head rotation direction is left, then the face mesh information and reference mesh information of the facial image with respect to the left direction, and the head rotation direction are used as samples. Several thousand groups of samples in the same direction can be selected and input these samples into the neural network model for training.

In step S204, in response to the head rotation information meeting an indication condition, the head indication information of the current participant is generated based on the head rotation information.

For example, if the head rotation information is that an angle of rotation to the right in the horizontal direction is greater than or equal to 45 degrees, the head indication information includes the information about the head swinging to the right; if the head rotation information is that an angle of rotation to the left in the horizontal direction is greater than or equal to 45 degrees, the head indication information includes the information about the head swinging to the left.

The embodiment of the present disclosure also provides a method for constructing reference information (such as the reference image and the reference mesh information) of each participant before the video conference is held.

In a specific embodiment, the method further includes the following steps:

In step S100-1, specific facial images of the current participant taken at multiple specific angles are acquired in advance.

For example, before the video conference is held, the current participant can take a specific facial image before entering the electronic conference room, or take a specific facial image when registering members of the electronic conference room. The embodiments of the present disclosure do not make specific limitations.

Optionally, the specific facial image includes a front facial image and side facial images on both sides. These three images can not only include the facial features of the current participant, but also reduce the amount of data processing, thereby improving the efficiency of the video conference.

In step S100-2, the two-dimensional positional information and the marking information of the facial structure points in each specific facial image are determined.

The facial structure points are marked in the facial area of the current participant in the specific facial image.

The facial structure points and the facial structure points in the video image of the current participant have a corresponding relationship in terms of the facial position of the current participant.

In step S100-3, each two-dimensional positional information is used as vertex position information to obtain specific mesh information, in the facial area of the specific facial image, according to a connection relationship rule of the marking information.

In step S100-4, a reference image and reference mesh information matched with the facial structure are acquired from a reference facial model library, based on the specific mesh information of the current participant.

In this specific embodiment, the facial mesh information is retrieved in the reference facial model library based on the specific mesh information in multiple specific facial images of the participant. When the specific mesh information matches the facial mesh information in the library, the reference information corresponding to the facial mesh information in the library is taken as the reference information that matches the facial structure of the participant. The reference information is obtained through multiple two-dimensional specific facial images, which simplifies a data acquisition step and improves the versatility and efficiency of data processing.

Figure 8:
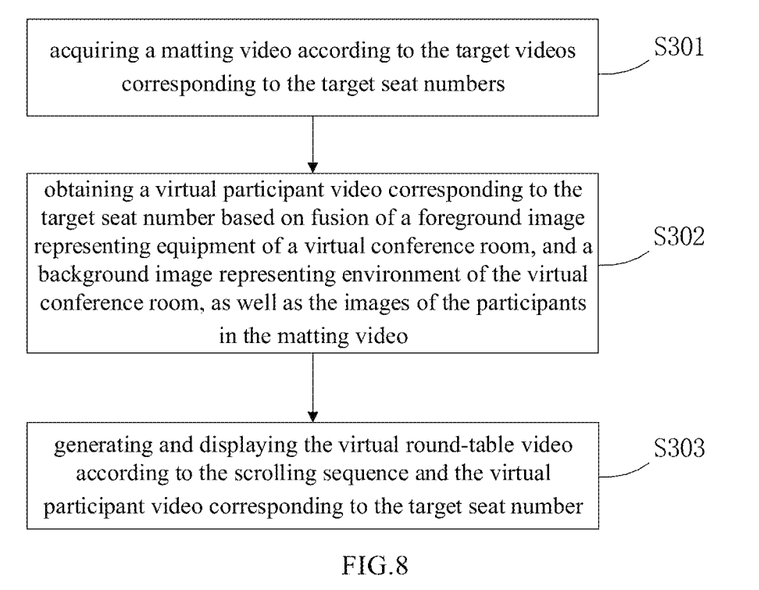
FIG. 8 shows a flowchart of a method for generating and displaying a virtual round-table video according to embodiments of the present disclosure.

Since the embodiment of the present disclosure is further optimized based on the above-mentioned embodiments, the explanations based on the same method and the meanings of the same name are the same as the above-mentioned embodiment, and will not be repeated here, as shown in FIG. 8.

Said that a virtual round-table video in the form of a simulated round-table conference is generated and displayed according to the scrolling sequence and the target videos corresponding to the target seat numbers includes the following steps:

In step S301, a matting video is acquired according to the target video corresponding to the target seat number.

The matting video only includes the image of the participant in the target video. It can be understood that the matting video is to remove a background image for the participant in the video, and only the image of the participant is retained. In order to be able to convert the video into a matting video in real time and quickly, the background of the participant is usually arranged in a single color (such as green) when the video is captured.

In step S302, a virtual participant video corresponding to the target seat number is acquired, based on the fusion of a foreground image representing the equipment of the virtual conference room, and a background image representing the virtual conference room environment, as well as the image of the participant in the matting video.

The foreground image and the background image are preset images. For example, a round-table image is taken as an image of the equipment of the virtual conference room, and windows and bookshelf images are taken as an image of environment of the virtual conference room. When fusing, the round-table image is used to block an image of the lower body of the participant, and only an image of the upper body of the participant is displayed. Meanwhile, the windows and bookshelf images are placed behind the image of the upper body, so that the virtual conference video corresponding to each target seat number includes the virtual video of the participant sitting in front of the round table in the conference room and participating in the conference.

In step 303, a virtual round-table video is generated and displayed according to the scrolling sequence and the virtual participant video corresponding to the target seat number.

The embodiments of the present disclosure add foreground and background to displayed images of the participant, so that the video conference is closer to a real conference scene, and the seriousness of the conference is increased.

In a specific embodiment, said that a virtual round-table video is generated and displayer according to the scrolling sequence and the virtual conference video corresponding to the target seat number includes the following steps:

In step 303-1, a first virtual participant image and a second virtual participant image corresponding to each time point in a continuous time point sequence are acquired.

The continuous time point sequence is the time point sequence required for scrolling from the scrolling starting number to the scrolling ending number. The continuous time point sequence is used to align the video images in the multiple target videos in accordance with time, so that the target video images related to the same time point can generate a virtual composite image. For example, the continuous time point sequence includes 10 time points: time points T1~T10; during scrolling, target videos A and B are related to time point T3, and persons in the target videos A and B are needed to synthesize into a virtual composite video.

Herein, the first virtual participant image belongs to a first virtual participant video, and the second virtual participant image belongs to a second virtual participant video.

In the scrolling sequence, the target seat number corresponding to the first virtual participant video is arranged adjacently in front of the target seat number corresponding to the second virtual participant video.

For example, the scrolling sequence includes target seat numbers 4-9, and if the target seat number corresponding to the first virtual participant video is 5, the target seat number corresponding to the second virtual participant video is 6.

In step 303-2, a percentage of a sequence number of the each time point in the continuous time point sequence to total sequence number of the continuous time point sequence is calculated to obtain a first cutting ratio.

For example, the continuous time point sequence includes 10 time points: time points T1~T10; then total number of the continuous time point sequences is 10; if the time point in the continuous time point sequence is T6, then the sequence number of T6 in the continuous time point sequence is 6, and the cutting ratio=the sequence number/total number=6/10=60%.

In step 303-3, a remaining second cutting ratio is obtained based on the first cutting ratio.

For example, continued above example, the second cutting ratio=1−the first cutting ratio=1−60%=40%.

In step 303-4, a length segmentation is performed on the second virtual participant image corresponding to the each time point, so that a second segmented image segmented based on the first cutting ratio is obtained from a side of a reverse scrolling direction, and a length segmentation is performed on the first virtual participant image corresponding to the each time point, so that a first segmented image segmented based on the second cutting ratio is obtained from a side of the scrolling direction.

Figure 9:
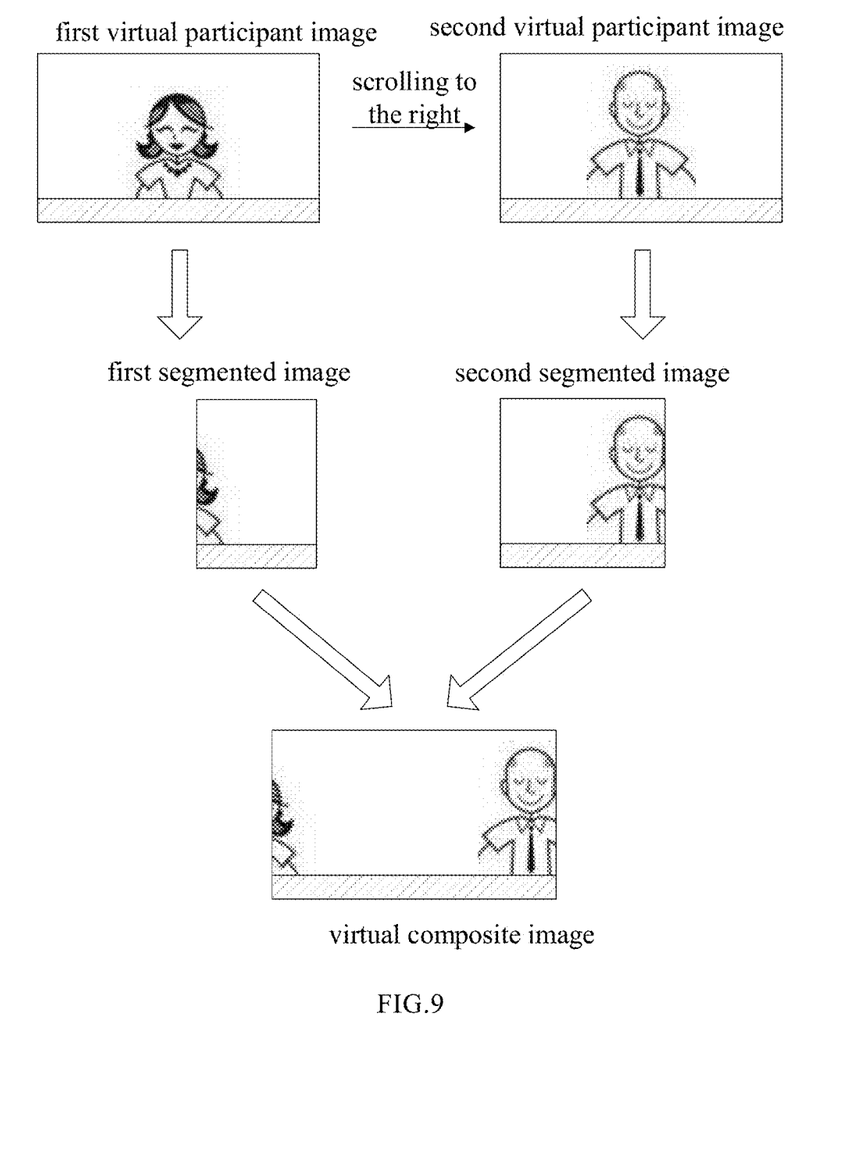
FIG. 9 shows a schematic diagram of a method for generating and displaying a virtual round-table video according to embodiments of the present disclosure.

For example, continued above example, as shown in FIG. 9, the virtual camera scrolls to the right, the length of the first virtual participant image=the length of the second virtual participant image=1000. Then after the segmentation on the second virtual participant image, the second segmented image on the left side of the second virtual participant image is obtained, which has a length=1000×60%=600; after the segmentation on the first virtual participant image, the first segmented image on the right side of the first virtual participant image is obtained, which has a length=1000×40%=400.

In step 303-5, a virtual composite image matching the seat number sequence is generated based on the target seat number corresponding to the first segmented image and the target seat number corresponding to the second segmented image.

For example, it is assumed that the seat number sequence is arranged from left to right, and if the target seat number corresponding to the first segmented image is 5 and the target seat number corresponding to the second segmented image is 6, then the first segmented image is on the left and the second segmented image is on the right, which is synthesized to generate a virtual composite image; continued above example, a length of the virtual composite image generated after synthesis=400+600=1000, which is collectively called a complete video image.

In step 303-6, a video clip of the virtual round-table video is generated and displayed based on the virtual composite image corresponding to continuous time points.

In the scrolling sequence, every two video clips corresponding to adjacent target seat numbers are synthesized to a virtual composite image through above-mentioned method, than all video clips form a virtual round-table video. The virtual round-table video shows the virtual camera rotating and scrolling the images of the target participants one by one.

The present disclosure also provides an apparatus embodiment inherited from above embodiment, which is used to implement the method and the steps described in above embodiment. The explanation based on the meaning of the same name is the same as above embodiment, and has the same technical effect as above embodiment, which are not repeated here.

Figure 10:
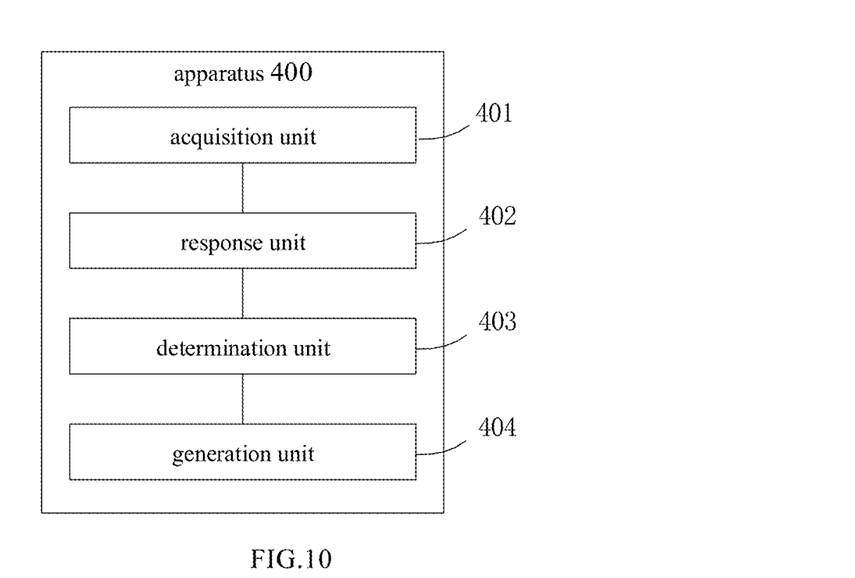
FIG. 10 shows a unit block diagram of an apparatus for generating a round-table video conference according to embodiments of the present disclosure.

As shown in FIG. 10, the present disclosure provides an apparatus 400 for generating a round-table video conference, including:

An acquisition unit 401 is configured to acquire head indication information of a current participant from a currently captured video.

A response unit 402 is configured to acquire a first seat number corresponding to the video of the current presenter and a second seat number corresponding to the video of the current speaker from a round-table seat number sequence in response to the head indication information. The first seat number is used to represent the scrolling starting number, and the second seat number is used to represent the scrolling ending number.

A determination unit 403 is configured to determine all target seat numbers and a scrolling sequence of the target seat numbers from the seat number sequence based on the scrolling starting number, the scrolling ending number, and the head indication information.

A generation unit 404 is configured to generate and display a virtual round-table video in the form of a simulated round-table conference according to the scrolling sequence and the target videos corresponding to the target seat numbers, wherein the virtual round-table video includes the images of the participants in the target video being scrolled and displayed to the images of the current speaker successively according to the scrolling sequence.

Optionally, the generating unit 404 includes:

A matting subunit is configured to acquire a matting video according to the target video corresponding to the target seat number, wherein the matting video only includes the image of the participant in the target video.

An image fusion subunit is configured to acquire a virtual conference video corresponding to the target seat number, based on the fusion of a foreground image representing the equipment of the virtual conference room and a background image representing the virtual conference room environment, as well as the image of the participant in the matting video.

A first generation subunit is configured to generate and display a virtual round-table video according to the scrolling sequence and the virtual conference video corresponding to the target seat number.

Optionally, the first generation subunit includes:

An image acquisition subunit is configured to acquire a first virtual participant image and a second virtual participant image corresponding to each time point in a continuous time point sequence, wherein the first virtual participant image belongs to a first virtual participant video, and the second virtual participant image belongs to a second virtual participant video, and the target seat number corresponding to the first virtual participant video is arranged adjacently in front of the target seat number corresponding to the second virtual participant video.

A ratio calculation subunit is configured to calculate a percentage of a sequence number of the each time point in the continuous time point sequence to total sequence number of the continuous time point sequence to obtain a first cutting ratio.

A ratio obtaining subunit is configured to obtain a remaining second cutting ratio based on the first cutting ratio.

An image segmentation subunit is configured to perform a length segmentation on the second virtual participant image corresponding to the each time point, so that a second segmented image segmented based on the first cutting ratio is obtained from a side of a reverse scrolling direction, and to perform a length segmentation on the first virtual participant image corresponding to the each time point, so that a first segmented image segmented based on the second cutting ratio is obtained from a side of the scrolling direction.

An image synthesis subunit is configured to generate a virtual composite image matching the seat number sequence based on the target seat number corresponding to the first segmented image and the target seat number corresponding to the second segmented image.

A segment generation subunit is configured to generate and display a video clip of the virtual round-table video based on the virtual composite image corresponding to continuous time points.

Optionally, the determination unit 403 includes:

A first response subunit is configured to determine all target seat numbers and a scrolling sequence of the target seat numbers from the seat number sequence from the scrolling starting number to the scrolling ending number orderly, in response to the scrolling starting number being smaller than the scrolling ending number, and the head indication information including information about the head swinging to the right.

A second response subunit is configured to determine all target seat numbers and a scrolling sequence of the target seat numbers from the seat number sequence from the scrolling starting number to the a starting number of the seat number sequence in reverse order, and from an ending number of the seat number sequence to the scrolling ending number in reverse order, in response to the scrolling starting number being smaller than the scrolling ending number, and the head indication information including information about the head swinging to the left.

A third response subunit is configured to determine all target seat numbers and a scrolling sequence of the target seat numbers from the seat number sequence from the scrolling starting number to the scrolling ending number in reverse order, in response to the scrolling starting number being greater than the scrolling ending number, and the head indication information including the information about the head swinging to the left.

A fourth response subunit is configured to determine all target seat numbers and a scrolling sequence of the target seat numbers from the seat number sequence from the scrolling starting number to an ending number of the seat number sequence orderly, and from a starting number of the seat number sequence to the scrolling ending number orderly, in response to the scrolling starting number being greater than the scrolling ending number, and the head indication information including the information about the head swinging to the right.

Optionally, the acquisition unit 401 includes:

A first acquisition subunit is configured to acquire a video image of the current participant from the currently captured video.

A first determination subunit is configured to determine two-dimensional positional information and marking information of facial structure points in the video image, where the facial structure points are marked in a facial area of the current participant in the video image.

A second determination subunit is configured to determine head rotation information of the current participant in a specified direction based on the two-dimensional positional information and marking information of all facial structure points.

A second generation subunit is configured to generate the head indication information of the current participant based on the head rotation information in response to the head rotation information satisfies an indication condition.

Optionally, the second determination subunit includes:

A first obtaining subunit is configured to obtain facial mesh information by using each two-dimensional positional information as vertex position information, according to a connection relationship rule of the marking information, in the facial area of the video image.

A second acquisition subunit is configured to input the reference mesh information and facial mesh information corresponding to the current participant into a trained neural network model to obtain the head rotation information, wherein the reference mesh information is obtained based on the two-dimensional positional information and the marking information of the facial structure points in a reference image of the current participant. The facial structure points in the video image and the facial structure points in the reference image have a corresponding relationship with respect to the facial position of the current participant.

Optionally, the apparatus further includes:

A pre-acquisition unit is configured to acquire in advance specific facial images of the current participant taken at multiple specific angles.

A structure determination unit is configured to determine the two-dimensional positional information and the marking information of the facial structure points in each specific facial image, where the facial structure points are marked in the facial area of the current participant in the specific facial image.

An obtaining unit is configured to obtain specific mesh information by using each two-dimensional positional information as vertex position information, in the facial area of the specific facial image, according to a connection relationship rule of the marking information.

A mesh acquisition unit is configured to acquire a reference image and reference mesh information matched with the facial structure matching from a reference facial model library, based on the specific mesh information of the current participant.

In the embodiment of the present disclosure, in response to the head instruction information of the participant, the scrolling starting number is determined from the round-table seat number sequence through the video of the current presenter, and the scrolling ending number is determined from the round-table seat number sequence through the video of the current speaker, thereby the scrolling sequence of the target seat numbers is obtained. According to the scrolling sequence, a manner of the virtual camera in the center of the round table being rotated and shooting is simulated, and the images of the participants queued between two points are scrolled and displayed, so that a virtual round-table conference scene is created in the video conference.

Figure 11:
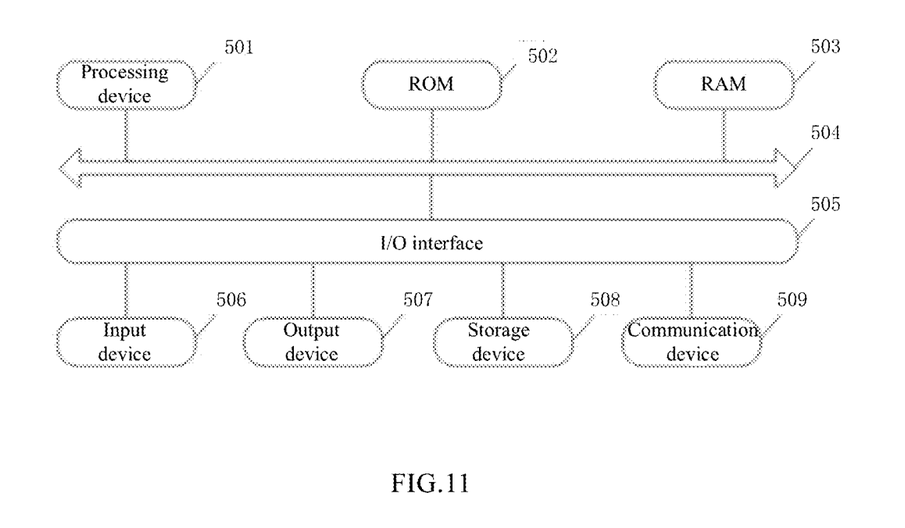
FIG. 11 shows a schematic diagram of a connection structure of an electronic device according to embodiments of the present disclosure.

As shown in FIG. 11, this embodiment provides an electronic device. The electronic device includes: at least one processor; and a memory communicatively connected with the at least one processor; wherein, the memory stores instructions executed by the one processor, when executed by the at least one processor, causing the at least one processor can implement the steps of the method described in above embodiments.

The embodiments of the present disclosure provide a non-volatile computer storage medium, and the computer storage medium stores computer-executable instructions, which can execute the steps of the method described in above embodiments.

Next, referring to FIG. 11, which shows a schematic structural diagram of an electronic device suitable for implementing the embodiments of the present disclosure. The terminal devices in the embodiments of the present disclosure may include, but are not limited to, mobile phones, notebook computers, digital broadcast receivers, PDAs (personal digital assistants), PADs (tablet computers), PMPs (portable multimedia players), vehicle-mounted terminals (for example, Car navigation terminals) and other mobile terminals and fixed terminals such as digital TVs, desktop computers, etc. The electronic device shown in FIG. 11 is only an example, and should not bring any limitation to the function and scope of use of the embodiments of the present disclosure.

As shown in FIG. 11, the electronic device may include a processing device (such as a central processing unit, a graphics processor, etc.) 501, which can be loaded into a random access memory according to a program stored in a read-only memory (ROM) 502 or from a storage device 508 (RAM) The program in 503 executes various appropriate actions and processing. In the RAM 503, various programs and data required for the operation of the electronic device are also stored. The processing device 501, the ROM 502, and the RAM 503 are connected to each other through a bus 504. An input/output (I/O) interface 505 is also connected to the bus 504.

Generally, the following devices can be connected to the I/O interface 505: including input devices 506 such as touch screen, touch pad, keyboard, mouse, camera, microphone, accelerometer, gyroscope, etc.; including, for example, liquid crystal display (LCD), speakers, vibration An output device 507 such as a device; a storage device 508 such as a magnetic tape, a hard disk, etc.; and a communication device 509. The communication device 509 may allow the electronic device to perform wireless or wired communication with other devices to exchange data. Although FIG. 11 shows an electronic device having various devices, it should be understood that it is not required to implement or have all of the illustrated devices. It may alternatively be implemented or provided with more or fewer devices.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from the network through the communication device 509, or installed from the storage device 508, or installed from the ROM 502. When the computer program is executed by the processing device 501, the above-mentioned functions defined in the method of the embodiment of the present disclosure are executed.

It should be noted that the aforementioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned electronic device; or it may exist alone without being assembled into the electronic device.

The computer program code used to perform the operations of the present disclosure can be written in one or more programming languages or a combination thereof. The above-mentioned programming languages include object-oriented programming languages—such as Java, Smalltalk, C++, and also conventional Procedural programming language—such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more for realizing the specified logical function Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations Or it can be realized by a combination of dedicated hardware and computer instructions.

The units described in the embodiments of the present disclosure may be implemented in a software manner, or may be implemented in a hardware manner. Among them, the name of the unit does not constitute a limitation on the unit itself under certain circumstances.

What is claimed is:

1. A method for generating a round-table video conference, comprising:
   acquiring head indication information of a current participant from a currently captured video;
   acquiring, in response to the head indication information, a first seat number corresponding to a video of the current presenter and a second seat number corresponding to a video of a current speaker from a round-table seat number, wherein the first seat number is used to represent a scrolling starting number, and the second seat number is used to represent a scrolling ending number;
   determining all target seat numbers and a scrolling sequence of the target seat numbers based on the scrolling starting number, the scrolling ending number and the head indication information; and
   generating and displaying a virtual round-table video in the form of a simulated round-table conference according to the scrolling sequence and target videos corresponding to the target seat numbers, wherein the virtual round-table video comprises images of the participants in the target videos being scrolled and displayed to an image of the current speaker successively according to the scrolling sequence;
   wherein the acquiring head indication information of a current participant from a currently captured video comprises:
   acquiring a video image of the current participant from the currently captured video;
   determining two-dimensional positional information and marking information of facial structure points in the video image, wherein the facial structure points are marked in a facial area of the current participant in the video image;
   determining head rotation information of the current participant in a specified direction based on the two-dimensional positional information and the marking information of all facial structure points; and
   generating, in response to the head rotation information satisfies an indication condition, the head indication information of the current participant based on the head rotation information.

2. The method according to claim 1, wherein the generating and displaying a virtual round-table video in the form of a simulated round-table conference according to the scrolling sequence and target videos corresponding to the target seat numbers comprises: acquiring a matting video according to the target videos corresponding to the target seat numbers, wherein the matting video only comprises the images of the participants in the target videos; obtaining a virtual participant video corresponding to the target seat number based on fusion of a foreground image representing equipment of a virtual conference room, and a background image representing environment of the virtual conference room, as well as the images of the participants in the matting video; and generating and displaying the virtual round-table video according to the scrolling sequence and the virtual participant video corresponding to the target seat number.

3. The method according to claim 2, wherein the generating and displaying the virtual round-table video according to the scrolling sequence and the virtual participant video corresponding to the target seat number comprises: acquiring a first virtual participant image and a second virtual participant image corresponding to each time point in a continuous time point sequence, wherein the first virtual participant image belongs to a first virtual participant video, and the second virtual participant image belongs to a second virtual participant video, and the target seat number corresponding to the first virtual participant video is arranged adjacently in front of the target seat number corresponding to the second virtual participant video in the scrolling sequence; calculating a percentage of a sequence number of the each time point in the continuous time point sequence to total sequence number of the continuous time point sequence to obtain a first cutting ratio; obtaining a remaining second cutting ratio based on the first cutting ratio; performing a length segmentation on the second virtual participant image corresponding to the each time point, so that a second segmented image segmented based on the first cutting ratio is obtained from a side of a reverse scrolling direction, and performing a length segmentation on the first virtual participant image corresponding to the each time point, so that a first segmented image segmented based on the second cutting ratio is obtained from a side of the scrolling direction; generating a virtual composite image matching the seat number sequence based on the target seat number corresponding to the first segmented image and the target seat number corresponding to the second segmented image; and generating and displaying a video clip of the virtual round-table based on the virtual composite image corresponding to continuous time points.

4. The method according to claim 1, wherein the determining all target seat numbers and a scrolling sequence of the target seat numbers based on the scrolling starting number, the scrolling ending number and the head indication information comprises: determining all target seat numbers and a scrolling sequence of the target seat numbers from the seat number sequence from the scrolling starting number to the scrolling ending number orderly, in response to the scrolling starting number being smaller than the scrolling ending number, and the head indication information including information about the head swinging to the right; determining all target seat numbers and a scrolling sequence of the target seat numbers from the seat number sequence from the scrolling starting number to the a starting number of the seat number sequence in reverse order, and from an ending number of the seat number sequence to the scrolling ending number in reverse order, in response to the scrolling starting number being smaller than the scrolling ending number, and the head indication information including information about the head swinging to the left; determining all target seat numbers and a scrolling sequence of the target seat numbers from the seat number sequence from the scrolling starting number to the scrolling ending number in reverse order in response to the scrolling starting number being greater than the scrolling ending number, and the head indication information including the information about the head swinging to the left; and determining all target seat numbers and a scrolling sequence of the target seat numbers from the seat number sequence from the scrolling starting number to an ending number of the seat number sequence orderly, and from a starting number of the seat number sequence to the scrolling ending number orderly, in response to the scrolling starting number being greater than the scrolling ending number, and the head indication information including the information about the head swinging to the right.

5. The method according to claim 1, wherein the determining head rotation information of the current participant in a specified direction based on the two-dimensional positional information and the marking information of all facial structure points comprises: in the facial area of the video image, using each two-dimensional positional information as vertex position information to obtain facial mesh information, according to a connection relationship rule of the marking information; and inputting reference mesh information and the facial mesh information corresponding to the current participant into a trained neural network model to obtain the head rotation information, wherein the reference mesh information is obtained based on the two-dimensional positional information and the marking information of the facial structure points in a reference image of the current participant, and the facial structure points in the video image and the facial structure points in the reference image have a corresponding relationship with respect to the facial position of the current participant.

6. The method according to claim 5, wherein the method further comprises: acquiring specific facial images of the current participant taken at multiple specific angles in advance; determining the two-dimensional positional information and the marking information of the facial structure points in each specific facial image, wherein the facial structure points are marked in the facial area of the current participant in the specific facial image; in the facial area of the specific facial image, using each two-dimensional positional information as vertex position information to obtain specific mesh information according to a connection relationship rule of the marking information; and acquiring a reference image and reference mesh information matched with the facial structure from a reference facial model library, based on the specific mesh information of the current participant.

7. An apparatus for generating a round-table video conference, comprising:

an acquisition unit configured to acquire head indication information of a current participant from a currently captured video;

a response unit configured to acquire, in response to the head indication information, a first seat number corresponding to a video of the current presenter and a second seat number corresponding to a video of a current speaker from a round-table seat number, wherein the first seat number is used to represent a scrolling starting number, and the second seat number is used to represent a scrolling ending number;

a determination unit configured to determine all target seat numbers and a scrolling sequence of the target seat numbers based on the scrolling starting number, the scrolling ending number and the head indication information; and a generation unit configured to generate and displaying a virtual round-table video in the form of a simulated round-table conference according to the scrolling sequence and target videos corresponding to the target seat numbers, wherein the virtual round-table video comprises images of the participants in the target videos being scrolled and displayed to an image of the current speaker successively according to the scrolling sequence;

wherein the acquiring head indication information of a current participant from a currently captured video comprises:

acquiring a video image of the current participant from the currently captured video;

determining two-dimensional positional information and marking information of facial structure points in the video image, wherein the facial structure points are marked in a facial area of the current participant in the video image;

determining head rotation information of the current participant in a specified direction based on the two-dimensional positional information and the marking information of all facial structure points; and generating, in response to the head rotation information satisfies an indication condition, the head indication information of the current participant based on the head rotation information.

8. A computer-readable storage medium with a computer-executable instructions stored thereon, when the computer-executable instructions are executed by a processor, the method according to claim 1 is implemented.

9. An electronic device, comprising: one or more processors; a storage configured to store one or more computer-executable instructions, wherein, when the one or more computer-executable instructions are executed by the one or more processors, the one or more processors implement the method according to claim 1.

* * * * *